Feb. 10, 1942. J. E. FRANCES 2,272,194

PIPE JOINT

Filed Sept. 23, 1939

INVENTOR
Joseph E. Frances
BY
Jos. B. Gardner,
ATTORNEY

Patented Feb. 10, 1942

2,272,194

UNITED STATES PATENT OFFICE 2,272,194

PIPE JOINT

Joseph E. Frances, Oakland, Calif.

Application September 23, 1939, Serial No. 296,260

4 Claims. (Cl. 285—115)

The invention relates to coupling means for pipe ends in a conduit system such as used for water and gas mains, drains, sewers, and the like.

An object of the invention is to provide a pipe joint of the character described whereby a plurality of pipe sections may be quickly and readily attached and sealed together with a substantial saving of time and labor as well as a material saving of packing and sealing material.

Another object of the invention is to provide a pipe joint of the character above wherein the pipe sections will be automatically self-aligned upon attachment of the same, and wherein the internal passages of the sections will be accordingly placed in positive registration and alignment.

A further object of the invention is to provide a pipe joint of the character described, wherein the oakum and lead packing material will be positively sealed and locked in place.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
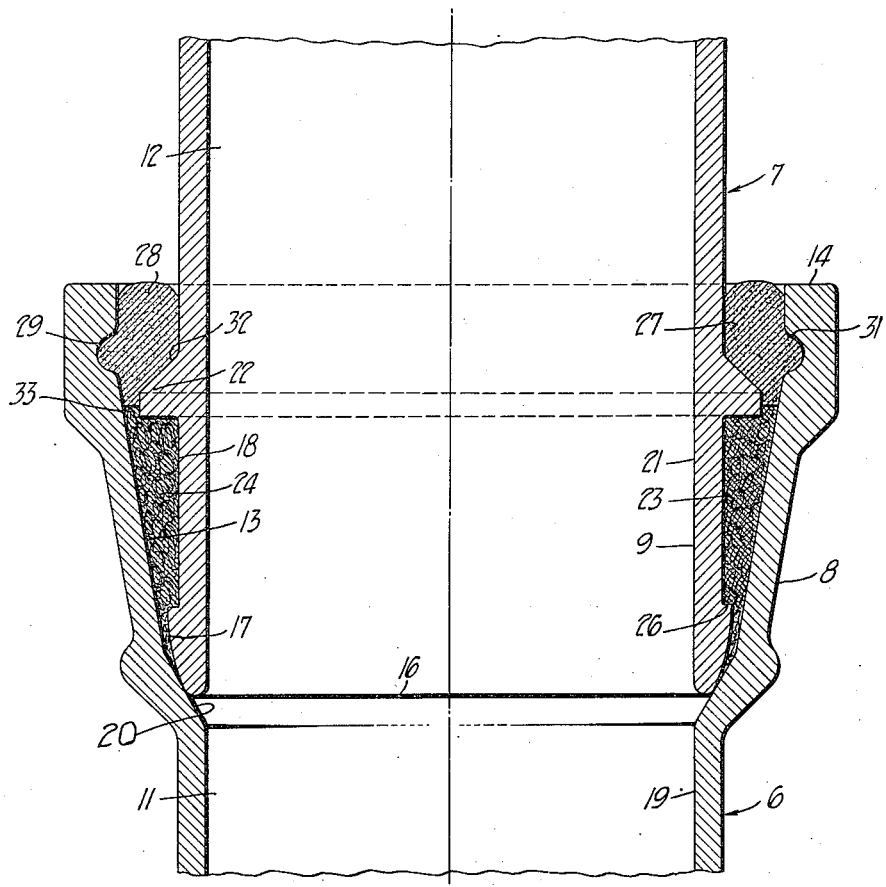
Figure 1 is a longitudinal sectional view of a pipe joint constructed in accordance with the present invention.

The pipe joint of the present invention and as depicted in the accompanying drawing, comprises a plurality of pipe sections 6 and 7 which are adapted for endwise alignment and attachment of end portions 8 and 9 thereof, so as to place in registration and alignment the internal passages 11 and 12 of the sections. The end portion 8 of the section 6 is here in the form of an enlarged bell hub which is adapted to telescopically receive the end portion 9 of the section 7. The inner wall 13 of the bell hub is generally flared outwardly towards the end 14 of the bell hub to facilitate the insertion of the end portion 9 of section 7, and preferably and as here shown, a part 17 of the outer surface 18 of the inner section 7, immediately adjacent to the end 16, is tapered or beveled to such end so as to provide an automatic seating and centering of the end 16 against and within the inner wall of the bell hub. Desirably, the surface part 17 is rounded in longitudinal section for tangential engagement with a wall part 20 of the wall 13 adjacent the inner end of the bell hub. Preferably, the diameter of the part 17 is selected relative to the varying diameter of the bell hub so as to locate the section 7 within the bell hub at a position positioning the inner surfaces 19 and 21 of the sections in longitudinal alignment. As here shown, the part 20 is formed with a greater taper than the remainder of the wall 13 and the part 17 is formed to fit directly against wall part 20 tangentially to the curve of part 17 so as to effect a substantial point or line engagement of the part 17 with the part 20. This point or line engagement provides a highly effective seal between the sections and also permits a limited amount of tilting or canting of the sections relative to each other without destroying the seal.

Mounted on the section 7 in spaced relation to the end 16 is a laterally projecting annular retaining means 22 for packing and which is located longitudinally within the inner wall 13 of the bell hub. The retaining means 22 is preferably, and as here shown, formed as an integral shoulder on the section 7 circumscribing the outer surface 18 thereof, although as will be understood, the same may be embodied in the form of a separate ring suitably attached to the outer surface of the section. The inner wall of the bell hub between the shoulder 22 and the end part 17 of section 7 is preferably formed as an inverted frustro-conical wall section, whereas the outer surface 18 of the section 7 between the same locations of the sections is preferably substantially cylindrical, whereby there is formed between the shoulder and part 17 and between the walls 13 and 18, an annular wedge shaped chamber 23 which is adapted for receipt of yarn or oakum 24 for packing of the joints. In installing the joint the yarn or oakum may be first wound around the outer surface of the section 7 between the shoulder 22 and the end part 17 thereof, whereby upon longitudinal insertion of the section 7 into the bell hub, the oakum will be firmly compressed within the wedge shaped chamber 23, and confined therein against outward movement by the shoulder 22. If desired, and as here shown, a small annular shoulder 26 may be provided adjacent the tapered part 17 of the sections so as to define together with the shoulder 22, a spool for the receipt of the oakum. Also if desired, the outer surface 18 between the shoulders 22 and 26 may be provided with one or a plurality of annular grooves in which the oakum may be wound.

In accordance with the present construction, the shoulder 22 is spaced inwardly from the outer end 14 of the bell hub so as to define with the inner wall of the bell hub and the outer wall of the section 7, an open end chamber 27 for the receipt of sealing lead 28. While of course the joint may be used in any position, the drawing illustrates the joint as used in a vertical installation, that is with the axes of the sections vertical, and with the section 6 lowermost, and with the bell hub 8 opening upwardly for the receipt of the end portion 9 of section 7, the portion 9 being the lower end of the section 7. Accordingly, the shoulder 22 defines the bottom for the lead chamber 27, and the lead in a molten form may be poured directly into the chamber 27 from the open upper end thereof. In order to positively lock the sealing lead in position in the chamber 27, I provide an annular lead retaining means 29 on the inner wall 13 of the bell hub in the chamber 27 outwardly from the shoulder 22. Means 29 is here in the form of an annular recess which provides a retaining shoulder 31 opposed to the shoulder 22 for positively locking the lead in the chamber against the shoulder 22. Upon cooling and setting of the lead, some shrinkage normally occurs and it is desirable to hammer or caulk the lead tightly into the chamber 27. This peening or caulking of the lead causes the same to drift into the chamber and fill the recess 29 and to seat firmly against the upper surface 32 of the shoulder 22. Preferably, this last named surface is beveled downwardly and outwardly so as to direct the molten lead outwardly into the clearance space 33 provided between the shoulder and the inner wall of the bell hub and also against the inner wall of the bell hub at the recess 29. Upon subsequent hammering of the lead, the incline of the surface 32 also assists in forcing the lead to drift outwardly into the recess 29 and also provides a radial component force tending to center the sections.

Figure 2:
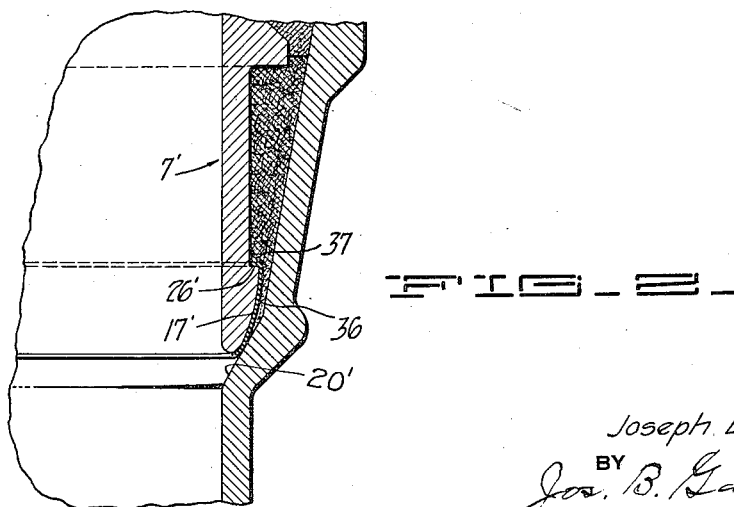
Figure 2 is a fragmentary longitudinal sectional view showing a modified form of the invention.

A modified form of the invention is illustrated in Figure 2, wherein a compressible sealing gasket 36 is mounted between the sealing surfaces 17' and 20' of the sections. The gasket here shown is preferably formed of rubber or equivalent material and is of annular form shaped to fit over the end part 17' of the inner section 7', and is provided with an inwardly projecting annular rib 37 at the upper end thereof for engagement over and locking behind the shoulder 26' at the upper end of part 17'. The use of this gasket positively insures a tight and proper seal between the sections.

In addition to the advantages afforded by the pipe joint in providing an improved and more permanent sealed attachment of the pipe sections, the present construction effects a saving of approximately sixty percent of the oakum formerly used and a saving of approximately twenty percent of the lead formerly used in effecting a similar type joint. Also, the present joint requires absolutely no hammering or caulking of the oakum or yarn, due to the novel wedge shaped construction of the oakum packing chamber and the self-oakum-compressing function of the chamber, with the result that approximately sixty-five percent of the labor formerly required is eliminated and saved.

I claim:

1. A pipe joint comprising, a pipe section having a bell hub at one end thereof and adapted for vertical mounting with said hub uppermost, a second pipe section having an end thereof adapted for insertion into said hub, said hub having an inverted frustro-conical inner wall portion, partition means on the exterior of said second section spaced from the end thereof by a distance positioning said means within said inner wall of said hub and including at least a part of said frustro-conical wall between said means and end to define a wedge shaped chamber at the inner side of said means for receipt of oakum or the like and to define an open end chamber at the outer side of said means for receipt of sealing lead or the like, said means substantially closing the top and bottom of said first and second chambers respectively.

2. A pipe joint comprising, a pipe section adapted for vertical mounting and provided with a bell hub at the upper end thereof, a second pipe section adapted for vertical mounting and having the lower end thereof adapted for insertion into said bell hub against the lower end thereof, an annular partition means provided on said second section in spaced relation from the inserted end of said second section and within the confines of the internal wall of said hub to define a chamber under said means for the receipt of oakum or the like and to define an open topped chamber at the upper side of said means for receipt of sealing lead, lead retaining means on said wall adjacent the upper end of said hub for locking the lead in said last named chamber, said means substantially closing the top of said first chamber and the bottom of said second chamber, the upper surface of said means providing the bottom wall of said second chamber being beveled outwardly and downwardly.

3. A pipe joint comprising, a pipe section having a bell hub at one end thereof and adapted for vertical mounting with said hub uppermost, a second pipe section having an end thereof adapted for insertion into said hub to engage the inserted end of said second section with the bottom end of said hub, partition means on the exterior of said second section spaced from the inserted end thereof by a distance positioning said partition means within the interior wall of said hub to define a chamber below said means for receipt of oakum or the like for packing between the exterior wall of said second section and the interior wall of said hub and between said means and said hub end, said partition means extending transversely from the exterior wall of said second section for the majority of the space between said exterior wall and said interior wall of said hub and being spaced from the upper end of said hub to define an open topped chamber at the upper side of said means for receipt of sealing lead or the like.

4. A pipe joint comprising, a pipe section adapted for vertical mounting and provided with a bell hub at the upper end thereof, a second pipe section adapted for vertical mounting and having the lower end thereof adapted for insertion into said bell hub against the lower end thereof, partition means on said second section in spaced relation from the inserted end of said second section and within the confines of the internal wall of said hub to define a chamber under said means for the receipt of oakum or the like and to define an open topped chamber at the upper side of said means for the receipt of sealing lead, said means extending outwardly from the exterior wall of said second section for the majority of the distance between said exterior wall and said interior wall of said hub, the upper surface of said means providing the bottom wall of said second chamber being beveled outwardly and downwardly to cause a centering of said second section in said bell hub upon caulking of said lead in said second chamber, said interior wall of said bell hub being formed with an annular recess opening to said second chamber for receiving and locking the lead in said second chamber.

JOSEPH E. FRANCES.